United States Patent [19]

Taniguchi et al.

[11] Patent Number: 5,719,246
[45] Date of Patent: Feb. 17, 1998

[54] ACRYLIC COPOLYMER AND POLYMER COMPOSITION CONTAINING SAME

[75] Inventors: Yasuyuki Taniguchi; Yuji Soejima, both of Yokohama, Japan

[73] Assignee: Mitsubishi Chemical Corporation, Tokyo, Japan

[21] Appl. No.: 750,797

[22] PCT Filed: Jun. 16, 1995

[86] PCT No.: PCT/JP95/01202

§ 371 Date: Dec. 20, 1996

§ 102(e) Date: Dec. 20, 1996

[87] PCT Pub. No.: WO95/35334

PCT Pub. Date: Dec. 28, 1995

[30] Foreign Application Priority Data

Jun. 22, 1994 [JP] Japan .................... 6-140244

[51] Int. Cl.$^6$ .................... C08F 220/20; C08L 33/04
[52] U.S. Cl. .................... 526/320; 525/446; 525/449; 525/523; 525/524; 526/319; 526/307.5; 526/329.7; 526/330; 526/342; 526/347
[58] Field of Search .................... 526/320, 319, 526/329.7, 307.5, 342; 525/523, 524

[56] References Cited

U.S. PATENT DOCUMENTS

| | | | |
|---|---|---|---|
| 3,856,830 | 12/1974 | Kuehn | 554/91 |
| 3,954,714 | 5/1976 | Kuehn | 526/301 |
| 4,181,785 | 1/1980 | Chattha | 525/161 |
| 4,605,719 | 8/1986 | Peelen | 526/282 |

*Primary Examiner*—Fred Zitomer
*Attorney, Agent, or Firm*—Oblon, Spivak, McClelland, Maier & Neustadt, P.C.

[57] ABSTRACT

According to the present invention, there is provided an acrylic copolymer having a number average molecular weight of 1000–500,000, which comprises 1–90 % by weight of a structural unit represented by the following general formula

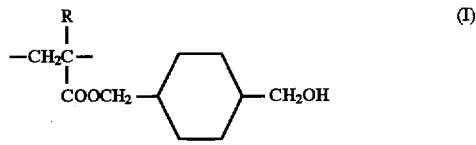

(wherein R represents a hydrogen atom or a methyl group) and 99–10 % by weight of a structural unit-derived from an ethylenic unsaturated monomer, an acrylic copolymer composition and a paint containing the same.

The coat obtained by applying the acrylic copolymer has excellent abrasion resistance, chemical resistance, flexibility, strength and the like.

15 Claims, No Drawings

ACRYLIC COPOLYMER AND POLYMER COMPOSITION CONTAINING SAME

TECHNICAL FIELD

The present invention relates to an acrylic copolymer. More specifically, it relates to an acrylic copolymer and a polymer composition thereof having a long pot life, and excellent abrasion resistance, chemical resistance, flexibility and the like, when applied to a paint.

BACKGROUND ART

Acrylic copolymers have been widely used for paints, inks, adhesives, and synthesized leathers and the like due to their excellent weather resistance, flexibility, strength and adhesive properties. Particularly, when used as a paint, various acrylic copolymers with different compositions suited for diverse requirements have been prepared and used for coating various materials used in the field of automobiles, electric home appliances, building materials and the like. In order to improve the abrasion resistance, chemical resistance and weather resistance of acrylic copolymers, it is conventionally known to blend an acrylic copolymer containing a hydroxyl group which is obtained by copolymerization of an acrylic monomer and a monomer containing a hydroxyl group with a crosslinking agent which is selected from the group consisting of a polyisocyanate compound, amino resin, epoxy compound, silane compound and metal chelate and then carrying out a crosslinking reaction (Shinzo Yamashita, Tosuke Kaneko, "Crosslinking Agents Handbook" Published by Taiseisha (1981)). In this case, as a monomer containing a hydroxyl group, hydroxyalkylene acrylate such as 2-hydroxyethyl acrylate (HEA), 2-hydroxyethyl methacrylate (HEMA), 2-hydroxypropyl acrylate (HPA) and 2-hydroxypropyl methacrylate (HPMA) is used. However, in the case of HPA and HPMA, the reactivity of the hydroxyl group bonded to a secondary carbon is low and in the case of HEA and HEMA, the hydroxyl group is bonded to a primary carbon, but the position is near to the main chain and has low degree of freedom. Thus it is difficult for the reaction to proceed rapidly after the crosslinking reaction proceeds. Accordingly, none of them can provide an ideally crosslinked product under normal conditions.

Therefore, in order to raise the reactivity of the hydroxyl group to be introduced to the acrylic copolymer, use of 4-hydroxybutyl acrylate (4HBA), 4-hydroxybutyl methacrylate (4HBMA) and a (meth)acrylate of polytetramethylene glycol, and the addition products of caprolactone to HEA, HEMA and the like have been proposed in some methods (Japanese Patent Publication No.3-7433, Japanese Patent LAid-open No.61-43623, and Japanese Patent Laid-open No.2-305873). However, these substances also cause such problems as insufficient hardness due to the flexibility of the side chain, decreased strength due to over large interbridge molecular weight, and greatly deteriorated weather resistance due to the polyester structure, and have not yet fulfilled the performances required.

PROBLEMS TO BE SOLVED BY THE INVENTION

An object of the present invention is to provide an acrylic copolymer having excellent abrasion resistance, and chemical resistance, at the same time having excellent flexibility, and long pot life, which can be most suitably used as a paint.

Another object of the present invention is to provide an acrylic copolymer composition which can be used not only for paint, but also for ink binders, coating materials for woven or non-woven fabrics, adhesives, sealers, potting compounds and the like.

Still another object of the present invention is to provide a paint which can provide a crosslinked coat having excellent strength, abrasion resistance, chemical resistance, heat resistance, weather resistance, hydrolysis resistance, flexibility and the like.

SUMMARY OF THE INVENTION

As a result of intensive study carried out in order to solve the above-mentioned problems, the present inventors found out that the above-mentioned objectives can be accomplished with an acrylic copolymer comprising an acrylic monomer having a specific structure and another ethylenic unsaturated monomer, and completed the present invention.

Accordingly, first aspect of the present invention is an acrylic copolymer having a number average molecular weight of 1000–500,000, which comprises 1–90% by weight of a structural unit represented by the following general formula

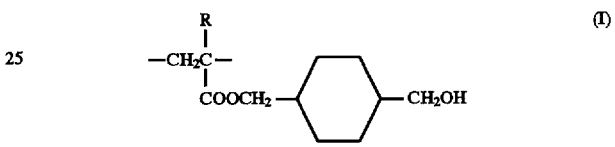

(wherein R represents a hydrogen atom or a methyl group) and 99–10% by weight of a structural unit derived from an ethylenic unsaturated monomer.

A second aspect of the present invention is an acrylic copolymer composition in which an acrylic copolymer (A) which is an essential component and has a number average molecular weight of 1000–500,000, and comprises 1–90% by weight of a structural unit represented by the following general formula

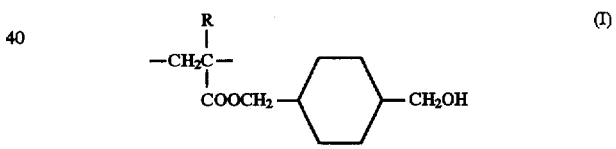

(wherein R represents a hydrogen atom or a methyl group) and 99–10% by weight of a structural unit derived from an ethylenic unsaturated monomer, is blended with a crosslinking agent (B) which is selected from the group consisting of polyisocyanate compounds, amino resins, epoxy resins, silane compounds and metal chelates.

A third aspect of the present invention is a paint composition in which an acrylic copolymer (A) which is an essential component and has a number average molecular weight of 1000–500,000 and comprises 1–90% by weight of a structural unit represented by the following general formula (I):

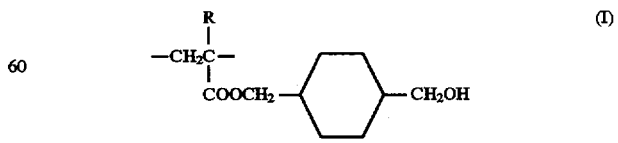

(wherein R represents a hydrogen atom or a methyl group) and 99–10% by weight of a structural unit derived from an ethylenic unsaturated monomer, is blended with a crosslinking agent (B) which is selected from the group consisting of polyisocyanate compounds, amino resins, epoxy resins, silane compounds and metal chelates.

DISCLOSURE OF INVENTION

The acrylic copolymer according to the present invention contains a structural unit represented by the above-mentioned general formula (I) in an amount of 1–90% by weight, and a structural unit derived from the other ethylenic unsaturated monomer in an amount of 99–10% by weight.

In order to introduce the structural unit represented by the above-mentioned general formula (I) into the acrylic copolymer, the following monomer, i.e. 1,4-cyclohexane dimethanol monoacrylate or 1,4-cyclohexane dimethanol monomethacrylate is allowed to exist when the copolymer is produced and these monomers are copolymerized with copolymerizable ethylenic unsaturated monomers. By the use of these monomers, the hydroxyl group introduced into the main chain shows high reactivity since it is bonded to a primary carbon, and since it is positioned appropriately apart from the main chain, it has flexibility and the reactivity is not drastically lowered even after the crosslinking reaction proceeds. Accordingly, an ideally crosslinked product can be obtained under mild conditions. In addition to that, the bulky cyclohexane ring present in the structural unit of formula (I) improves the toughness of the coat and imparts excellent abrasion resistance and chemical resistance to the coat, and tempers excess flexibility to prolong the pot life advantageously.

The ratio of the structural unit represented by the above-mentioned general formula (I) contained in the acrylic copolymer of the present invention is 1–90% by weight, preferably 2–80% by weight, more preferably 8–70% by weight. When the ratio of the structural unit contained is below 1% by weight, the above-mentioned effects of the present invention cannot be fully achieved, however, the ratio exceeding 90% by weight is also undesirable as it results in too high viscosity of the obtained copolymer to decrease the solubility in an organic solvent, and provides a problem in production of products such as paints.

A copolymerizable ethylenic unsaturated monomer for providing the acrylic copolymer according to the present invention can be any monomer as far as it can be copolymerized with 1,4-cyclohexane dimethanol monoacrylate or 1,4-cyclohexane dimethanol monoacrylate (a), and an ordinary unsaturated monomer which can be subjected to radical polymerization can be used.

Examples of such unsaturated monomers include hard monomers (b) selected from the group consisting of methyl methacrylate, styrene, methyl styrene, p-vinyl toluene, acrylonitrile and acrylamide, and soft monomers (c) selected from the group consisting of alkyl acrylate (the number of carbon atoms in the alkyl is 1–21), alkyl methacrylate (the number of carbon atoms in the alkyl is 2–21), vinyl acetate and vinyl propionate.

Examples of the above-mentioned alkyl acrylate (the number of carbon atoms in the alkyl is 1–21) or alkyl methacrylate (the number of carbon atoms in the alkyl is 2–21) include methyl acrylate, ethyl (meth)acrylate, propyl (meth)acrylate, n-butyl (meth)acrylate, isobutyl (meth) acrylate, t-butyl (meth)acrylate, 2-ethylhexyl (meth) acrylate, cyclohexyl (meth)acrylate, n-octyl (meth)acrylate, lauryl (meth)acrylate, tridecyl (meth)acrylate, and stearyl (meth)acrylate.

The hard monomers (b) and the soft monomers (c) are divided according to the glass transition point of the homopolymer obtained from the monomer, and those having a glass transition point of 100° C. or higher are referred to as hard monomers, and those having a transition point of less than 100° C. are referred to as soft monomers (see "Polymer Handbook" published by Interscience Publishers (1966)).

According to the present invention, it is particularly preferable to use as the ethylenic unsaturated monomer, the above-mentioned hard monomer (b) and the soft monomer (c) in combination. It is believed that the use of the hard monomer improves the surface hardness, tensile strength and rigidity of the coat, and the use of the soft monomer provides flexibility, pliability and follow-up property of the coat.

In addition to that, an unsaturated monomer containing a hydroxyl group such as glycidyl (meth)acrylate, acrylic acid, methacrylic acid, 2-hydroxyethyl (meth)acrylate, 2-hydroxypropyl (meth)acrylate, 4-hydroxybutyl (meth) acrylate, mono(meth)acrylate of polyether glycol and an adduct of caprolactone or β-methyl-δ-valerolactone to these monomers can be used together with the above-mentioned monomers (b) and (c) as long as it is in a range that does not mar the effect of the present invention.

The acrylic copolymer according to the present invention is preferably obtained by copolymerization of (a) 1–90% by weight, preferably 2–80% by weight of 1,4-cyclohexane dimethanol monoacrylate or 1,4-cyclohexane dimethanol monomethacrylate, (b) 5–94% by weight, preferably 10–88% by weight of the above-mentioned hard monomer, and (c) 5–94% by weight, preferably 10–88% by weight of the above-mentioned soft monomer.

The polymerization process to be employed for the production of the acrylic copolymer according to the present invention can be any known process such as solution polymerization, bulk polymerization, emulsion polymerization and suspension polymerization. However, the solution polymerization process is preferably employed in order to obtain facilitated control of the polymerization reaction, good workability in producing the paint therefrom, and no immixture of impurities such as a dispersing agent or emulsifying agent. In the case of solution polymerization, the monomer components are copolymerized in the presence of an organic solvent and a polymerization initiator, and a chain transfer agent in some cases. The usable organic solvents are those which can be used for solution polymerization of unsaturated monomers. Examples thereof include isopropyl alcohol, n-butyl alcohol, methyl ethyl ketone, methyl isobutyl ketone, toluene, xylene, ethyl acetate, butyl acetate and the like.

Preferable polymerization initiators are those which can be dissolved in an unsaturated monomer, and examples include azobisisobutylonitrile, benzoyl peroxide, di-t-butyl peroxide, cumenhydroperoxide and the like. Examples of the chain transfer agent which can be used for controlling the molecular weight of the resulting copolymer include 2-mercapto ethanol, dodecyl mercaptan and the like.

The number average molecular weight of the acrylic copolymer according to the present invention must be in a range of from 1000 to 500,000. By number average molecular weight of the acrylic copolymer is meant the number average molecular weight obtained by measurement using GPC (gel permeation chromatography) followed by conversion based on a standard polystyrene. When the number average molecular weight is less than 1000, the resulting crosslinked coat shows poor durability and the number average molecular weight exceeding 500,000 is undesirable, since the viscosity becomes too high to worsen the workability.

The acrylic copolymer according to the present invention, having a hydroxy number in a range of from 2 to 250 KOH mg/g will provide a coat having excellent strength, abrasion resistance, chemical resistance and flexibility. The hydroxy number of the acrylic copolymer refers to the hydroxy number measured in conformity with JIS K 1557. When the hydroxy number is less than 2 KOH mg/g, the strength of the crosslinked coat is lowered. Also a hydroxy number exceeding 250 KOH mg/g is undesirable, since the flexibility of the crosslinked coat is decreased, and the available time is shortened.

The acrylic copolymer composition according to the present invention is obtained by blending the above-mentioned acrylic copolymer (A), as an essential component, and a crosslinking agent (B). A preferable example of the usable crosslinking agent is a compound selected from the group consisting of a polycyanate compound, amino resin, epoxy compound, silane compound and metal chelate.

Examples of the polyisocyanate compound include diisocyanates such as p-phenylene diisocyanate, naphthalene diisocyanate, tolylene diisocyanate, diphenyl methane diisocyanate, trimethylhexane diisocyanate, isophorone diisocyanate, xylylene diisocyanate, tetramethylxylylene diisocyanate, lysine diisocyanate, and a trimer thereof or a low molecular weight polyol adduct thereof.

Examples of amino resins include melamine, benzoguanamine, and urea and the like, examples of epoxy compounds include bisphenol A type epoxy resins and the like, examples of silane compounds include acetoxy silane, alkoxy silane, ketoxime silane, amino silane, aminoxy silane and the like. Examples of metal chelates include an alkoxide, acetyl acetonate, and acylate of Ti, Zr, Al and the like.

Among the above-mentioned crosslinking agents, polyisocyanate compounds are preferable from the view point of well balanced available time and crosslinking reactivity, abrasion resistance, chemical resistance as well as adhesive properties, and particularly preferable are aliphatic or alicyclic polyisocyanate compounds.

The amount of the above-mentioned crosslinking agent to be added to the acrylic copolymer can be appropriately selected according to the hydroxyl group contained in the acrylic copolymer, and the preferable amount is so selected that the reactive functional group (isocyanate group, epoxy group, amino group and acetoxy group in acetoxy silane or alkoxy group in alkoxy silane) in the crosslinking agent becomes preferably 0.5–4 times (further preferably 0.8–2 times) that of the hydroxyl group (OH group) contained in the acrylic copolymer.

In order to accelerate the crosslinking reaction of the acrylic copolymer composition of the present invention during its use, a catalyst suited for each composition can be also added to the acrylic copolymer composition of the present invention. Examples of the usable catalyst include amines such as triethylene diamine and triethyl amine, and organic tin compounds such as dibutyl tin dilaurate when the crosslinking agent is a polyisocyanate compound; amines such as dimethylbenzylamine, and phenol when the crosslinking agent is an epoxy compound; and organic acids such as paratoluene sulphonic acid and organic tin compounds such as dibutyl tin diacetate when the crosslinking agent is a silane compound.

According to the acrylic copolymer composition of the present invention, the reactivity of the crosslinking reaction is not greatly lowered when the reaction proceeds. Accordingly, an ideally crosslinked body can be obtained under mild conditions and it can be used not only for paints but also for ink binders, coating agents for woven, nonwoven fabrics, adhesives, sealers and potting compounds.

For applying the acrylic copolymer of the present invention to a paint, the acrylic copolymer (A) may be blended with a crosslinking agent (B) and if necessary another polymer is further blended to provide a polymer composition for the paint. The paint is coated on a various materials to provide a crosslinked coat film. When the acrylic copolymer is produced by solution polymerization, it is preferable that the copolymer is not separated from the organic solvent, but the crosslinking agent is added to the polymer solution, and it is coated on various materials, then the organic solvent is evaporated therefrom. As the crosslinking agent, products similar to those mentioned above can be used.

Other polymers which can be blended, if necessary, with the polymer composition containing the acrylic copolymer and the crosslinking agent are preferably polymers having compatibility with the acrylic copolymer. Illustrative examples include acrylic resins such as polymethyl methacrylate, styrene/alkyl acrylate copolymer, polyesters, polyurethanes, polyethers, polyamides, polycarbonate, polyvinyl chloride type resins, phenol resins, alkid resins and the like. The amount of the other polymers mentioned above to be blended with the acrylic copolymer is preferably in a range of from 10:90 to 100:0 by weight ratio.

In order to form a crosslinked coat from the paint of the present invention, the paint is coated on a desired material, heated and then dried. The heating temperature and the heating time depend on the kind and the content of the acrylic copolymer, the kind and the blending amount of the crosslinking agent, the kind and the content of the solvent, the presence or absence, and the kind and amount of the crosslinking acceleration catalyst. However, it is preferable to select the temperature in the range of from 50° to 200° C. and the time in the range of from some seconds to some hours.

In this way, a crosslinked coat film with excellent strength, abrasion resistance, chemical resistance, heat resistance, weather resistance, hydrolysis resistance and flexibility can be obtained.

EXAMPLES

The present invention will be further illustrated with the following Examples, but the present invention is not to be limited thereby, as far as it is within the purport thereof.

In the following examples, parts refer to parts by weight. The details of the evaluation items and the evaluation methods on the raw materials and the products are given as follows.

(i) Hydroxy number

Measured in conformity with JIS K 1557.

(ii) Viscosity

E-type viscometer EHD-R type (manufactured by Tokyo Keiki Co., Ltd.) was used under such measuring conditions as temperature of 25° C., sample amount of 1.5 ml; a standard rotor (1° 34') was used.

(iii) Molecular weight

Used instrument... GPL apparatus HLC-8020 Type (manufactured by Tosoh Corporation)

Column used: G3000HXL, G4000HXL, G6000HXL

Measuring conditions:

solvent: tetrahydrofuran, resin content of 0.2% by weight, temperature: 40°

For measuring the molecular weight, a calibration curve was produced with a monodisperse standard polystyrene, then measurement was carried out in the same manner but by using the acrylic copolymer of the present invention and the measured value was converted to a standard polystyrene basis.

(iv) Pot life

An acrylic copolymer and a polyisocyanate compound in such amounts were mixed that the molar ratio between the hydroxyl group of the acrylic copolymer and the reactive functional group of the crosslinking agent became 1:1 and the resulting mixture was allowed to stand at 23° C. and the time required for the solution viscosity to become double the initial value was measured.

The following evaluation tests of (v)–(viii) were carried out on a coat film having a thickness of 100 μm, which was obtained by mixing a solution of the acrylic copolymer produced in Examples and Comparative Examples with a polyisocyanate compound as a crosslinking agent, in such amounts that the molar ratio between the hydroxyl group of the acrylic copolymer and the reactive functional group of the crosslinking agent became 1:1, followed by coating it on a releasing paper, heating and curing it at 80° C. for 24 hours.

(v) Pencil hardness

Measured in conformity with JIS K 5400

(vi) Glass transition point

Measured by using differential scanning calorimeter (DSC 20 manufactured by Seiko Denshi Kogyo Co., Ltd.) at temperature rising rate of 20° C./min.

(vii) Breaking strength, Breaking extension

Measured in conformity with JIS K 6301 by using Tension UTM-III-100 (manufactured by Orienteck Co., Ltd) under such conditions as temperature of 23° C., relative humidity of 65%.

(viii) Solvent resistance

The surface of a coat film formed on a material being rubbed with cotton impregnated with methyl ethyl ketone under a determined amount of load, one reciprocating motion was counted as one rub, the surface condition after 10 rubs being observed visually eyes and the results are shown as follows.

*: Absolutely no change was recognized.

O: A flaw was found on the surface.

Δ: A part of the coat was found broken.

X: Peeling of the coat was found.

I. Production of an Acrylic Copolymer and an Acrylic Copolymer Composition, and Evaluation Example 1

Into a four neck flask having a stirrer, a thermometer, a reflux condenser and a dropping funnel were added 60 parts of toluene, 0.2 parts of dodecyl mercaptan, and 0.3 parts of azobisisobutylonitrile, mixture was stirred and mixed until it became homogeneous, and then the system was purged with nitrogen. Then, the internal temperature was raised to 70° C., and a monomer mixture of 32.7 parts of methyl acrylate and 7.1 parts of cyclohexane dimethanol monoacrylate was added thereto dropwise. After completion of the dropping, reaction was carried out at 70° C. for 10 hours to give an acrylic copolymer solution. The resulting copolymer had a hydroxy number of 50.0 KOHmg/g, a viscosity of 300 mPa. sec, weight average molecular weight of 46900, and a number average molecular weight of 23000 (see Table 1).

This acrylic copolymer solution was evaluated by the above-mentioned evaluation methods and the results are shown in Table 2.

Example 2

Into a four neck flask having a stirrer, a thermometer, a reflux condenser and a dropping funnel, were added 60 parts of toluene, 3 parts of dodecyl mercaptan, and 0.3 parts of azobisisobutylonitrile, the mixture was stirred and mixed until it became homogeneous, and then the system was purged with nitrogen. Then, the internal temperature was raised to 70° C., and a monomer mixture of 21.0 parts of methyl acrylate and 16.0 parts of cyclohexane dimethanol monoacrylate was added thereto dropwise. After completion of the dropping, reaction was carried out at 70° C. for 8 hours to give an acrylic copolymer solution.

The resulting copolymer had a hydroxy number of 112.7 KOHmg/g, a viscosity of 21 mPa. sec, a weight average molecular weight of 3200, and a number average molecular weight of 1500 (see Table 1).

This acrylic copolymer solution was evaluated by the above-mentioned evaluation methods and the results are shown in Table 2.

Example 3

Into a four neck flask having a stirrer, a thermometer, a reflux condenser and a dropping funnel, were added 60 parts of toluene, 0.2 parts of azobisisobutylonitrile, the mixture was stirred, mixed until it became homogeneous, and then the system was purged with nitrogen. Then, the internal temperature was raised to 70° C., and a monomer mixture of 34.3 parts of methyl acrylate, 3.6 parts of cyclohexane dimethanol monoacrylate, and 2.1 parts of 2-hydroxyethyl acrylate was added thereto dropwise. After completion of the dropping, reaction was carried out at 70° C. for 15 hours to give an acrylic copolymer solution. The resulting copolymer had a hydroxy number of 50.0 KOHmg/g, a viscosity of 1270 mPa. sec, a weight average molecular weight of 141500, and a number average molecular weight of 54300 (see Table 1).

This acrylic copolymer solution was evaluated by the above-mentioned evaluation methods and the results are shown in Table 2.

Examples 4–7 and Comparative Examples 1–7

The process similar to that used in Example 1 was carried out except that the composition of the monomers was changed as shown in Table 1 to give an acrylic copolymer solution. The analytical data on the resulting copolymers are shown in Table 1, and the physical property evaluation results on the resulting acrylic copolymer solutions are shown in Table 2.

TABLE 1

| | Example | | | | | | |
|---|---|---|---|---|---|---|---|
| | 1 | 2 | 3 | 4 | 5 | 6 | 7 |
| Composition of raw material (pbw): | | | | | | | |
| Methylacrylate | 32.7 | 21.0 | 34.1 | 11.8 | — | — | — |
| Styrene | — | — | — | — | 10.0 | — | 5.0 |
| n-butyl methacrylate | — | — | — | — | 22.7 | 22.7 | 22.7 |
| Methyl methacrylate | — | — | — | — | — | 10.0 | 5.0 |
| Cyclohexne dimethanol monoacrylate | 7.1 | 16.0 | 3.6 | 28.0 | 7.1 | 7.1 | 7.1 |
| HEA*1 | — | — | 2.1 | — | — | — | — |
| 4HBA*2 | — | — | — | — | — | — | — |
| HEMA-caprolacton adduct*3 | — | — | — | — | — | — | — |
| Acrylate of PTMG*4 | — | — | — | — | — | — | — |
| Analytical value: | | | | | | | |
| Hydroxy number (KOHmg/g)*5 | 50.0 | 112.7 | 50.0 | 197.2 | 50.0 | 50.0 | 50.0 |
| Viscosity (mPa · sec) | 300 | 21 | 1270 | 550 | 520 | 610 | 565 |
| Weight-average molecular weight (× 10⁴) | 2.30 | 0.15 | 5.43 | 2.51 | 2.09 | 2.24 | 2.16 |

| | Comparative Example | | | | | | |
|---|---|---|---|---|---|---|---|
| | 1 | 2 | 3 | 4 | 5 | 6 | 7 |
| Composition of raw material (pbw): | | | | | | | |
| Methylacrylate | 35.7 | 34.7 | 39.7 | 31.2 | 30.0 | — | — |
| Styrene | — | — | — | — | — | 10.0 | 10.0 |
| n-butyl methacrylate | — | — | — | — | — | 21.2 | 21.2 |
| Methyl methacrylate | — | — | — | — | — | — | — |
| Cyclohexne dimethanol monoacrylate | — | — | 0.1 | — | — | — | — |
| HEA*1 | 4.1 | — | — | — | — | — | — |
| 4HBA*2 | — | 5.1 | — | — | — | — | — |
| HEMA-caprolacton adduct*3 | — | — | — | 8.6 | — | 8.6 | 4.0 |
| Acrylate of PTMG*4 | — | — | — | — | 9.6 | — | — |
| Analytical value: | | | | | | | |
| Hydroxy number (KOHmg/g)*5 | 50.0 | 50.0 | 0.7 | 50.0 | 50.0 | 50.0 | 50.0 |
| Viscosity (mPa · sec) | 390 | 260 | 270 | 250 | 910 | 480 | 435 |
| Weight-average molecular weight (× 10⁴) | 4.24 | 4.10 | 3.90 | 4.08 | 9.28 | 4.05 | 4.10 |
| Number-average molecular | 2.21 | 2.23 | 2.11 | 2.10 | 3.65 | 2.01 | 2.11 |

*1 2-hydroxyethyl acrylate
*2 4-hydroxybutyl acrylate
*3 PLACCEL FM-1 (Adduct of HEMA with 1 mole of caprolacton) produced by Daisel Chemical Ind.
*4 Monoacrylate of Polytetramethylene glycol(MW:200)
*5 Conversion value based on solid copolymer

TABLE 2

| Type of acrylic copolymer | 1 | 2 | 3 | 4 | 5 | 6 | 7 | 1 |
|---|---|---|---|---|---|---|---|---|
| | Example | | | | | | | |
| Type of crossliking agent | HMDI*4 | HMDI | HMDI | HMDI | HMDI | HMDI | HMDI | IPDI*5 |
| Pot life(hr) | 24 | 18 | 13 | 10 | 21 | 20 | 20 | 33 |
| Pencil hardness | F | H | F | 2 H | 2 H | 2 H | 2 H | 2 H |
| Glass transition point (°C.) | 21 | 23 | 17 | 25 | 38 | 40 | 39 | 31 |
| Breaking strength (MPa) | 28.7 | 32.5 | 25.5 | 41.5 | 43.5 | 48.0 | 46.0 | 38.1 |
| Breaking extention (%) | 100 | 85 | 110 | 70 | 7 | 9 | 8 | 68 |
| Solvent resistance | ○ | ⊚ | ○ | ⊚ | ⊚ | ⊚ | ⊚ | ○ |
| | Comparative Example | | | | | | | |
| Type of crossliking agent | HMDI*4 | HMDI | HMDI | HMDI | HMDI | HMDI | HMDI | |
| Pot life(hr) | 8 | 10 | 24 | 10 | 12 | 5 | 6 | |
| Pencil hardness | F | B | HB | 3 B | 6 B | HB | HB | |
| Glass transition point (°C.) | 16 | 14 | 9 | 5 | 2 | 32 | 24 | |
| Breaking strength (MPa) | 18.2 | 16.7 | 10.5 | 9.5 | 7.9 | 15.0 | 16.6 | |

TABLE 2-continued

| Type of acrylic copolymer | 1 | 2 | 3 | 4 | 5 | 6 | 7 | 1 |
|---|---|---|---|---|---|---|---|---|
| Breaking extention (%) | 120 | 110 | 180 | 250 | 460 | 25 | 70 | |
| Solvent resistance | x | Δ | x | x | x | x | x | |

*4 "MITEC" NY730A (trimer of hexamethylene diisocyanate) produced by Mitsubishi Chemical Corp.
*5 "MITEC" NY215A (Adduct of isophorone diisocyanate with trimethylol propane) produced by Mitsubishi Chemical Corp.

II. Preparation of a paint and evaluation

(1) Preparation of a main agent for a white paint

The acrylic copolymer solution obtained in the above-mentioned Examples and Comparative Examples was added to a stainless beaker according to the following formulation, then stirred in an emulsifier for 30 minutes to give a main agent for a white paint.

| | |
|---|---|
| Acrylic copolymer solution (solid content of 40%) | 105.0 parts |
| Titanium oxide (CR90) *1) | 50.0 parts |
| Modaflow *2) | 0.1 parts |
| Thinner *3) | 50.0 parts |
| Solid content | 205.1 parts |

*1) Rutile type titanium oxide produced by Ishihara Sangyo Kaisha, Ltd.
*2) Acrylic surface conditioner produced by Monsanto Co., Ltd.
*3) Xylene/cellosolve acetate = 80/20 mixed solution

(2) Preparation of a White Paint

To 205.1 parts of the above-mentioned main agent for a white paint were added 7.5 parts of MITEC NY730A (Trade Name) (HMDI trimer) or 11.6 parts of MITEC NY215A (Trade Name) (IPDI-trimethylol propane adduct) as a urethane curing agent, and about 25 parts of the above-mentioned thinner to prepare a white enamel paint for spray coating.

(3) Formation of a Test Coat

The above-mentioned white enamel paint was coated in a thickness of about 25 μm by spray coating, on a soft steel plate having been subjected to zinc phosphate treatment. This was allowed to stand at room temperature for about 10 minutes, then baked at 100° C. for 30 minutes to form a white coat.

The results of the performance test of the coat are shown in Table 3.

The performance test of the coat shown in the table was carried out according to the following methods.

(i) Pencil hardness

Measured in conformity with JIS K 5400.

(ii) Solvent resistance

The surface of a coat film formed on a material was rubbed with cotton impregnated with methyl ethyl ketone under a determined amount of load, one reciprocating motion being counted as one rub and the surface condition after 10 rubs was visually observed and the results are shown as follows.

*: Absolutely no change was recognized.

O: A flaw was found on the surface.

Δ: A part of the coat was found broken.

X: Peeling of the coat was found.

(iii) Stain resistance

Carbon black MA-100 (produced by Mitsubishi Chemical Co., Ltd.) as a staining material was applied to a piece of gauze and this was lightly rubbed on a coat film. The coat film was allowed to stand in a thermostatic chamber at 20° C., under 75% RH for 24 hours, then washed with running water. The degree of stain visually observed was determined and the results are shown as follows.

O: Good

Δ: Little stain was left.

X: Considerable stain was left.

(iv) Scuff resistance

A mixed solution of cleanser and water (3:2) was used as an abrasion agent, and a color fastness abrasion tester (manufactured by Toyo Seiki Co., Ltd.) was employed. The abrasion agent was applied to a piece of flannel, and used to rub the test coat 20 times (reciprocating motion) under a load of 500 g. Then the coat film surface was washed with running water, dried naturally and the specular reflectivity of the coated surface at 20 degrees was measured.

The gloss retaining ratio was obtained according to the following equation, and the obtained value was used for evaluation of scuff resistance.

20 degrees gloss retaining ratio=[20° G value after the test/20° G value before the test]×100 (%)

O: Retaining ratio was over 50%

Δ: Retaining ratio was 20% or more and 50% or less.

X: Retaining ratio was less than 20%.

(v) Adherability: Evaluation by lattice pattern peel test

The coat film was striated with a cutter to provide a total of 100 squares in 1 cm$^2$. And a cellophane adhesive tape was applied thereon, the tape was then peeled off, and the number of remaining squares x is shown in the form of x/100.

TABLE 3

| Type of acrylic copolymer | 1 | 2 | 3 | 4 | 5 | 6 | 7 | 1 |
|---|---|---|---|---|---|---|---|---|
| | | | | Example | | | | |
| Type of crossliking agent | HMDI*4 | HMDI | HMDI | HMDI | HMDI | HMDI | HMDI | IPDI*5 |
| Pencil hardness | H | 2 H | H | 2 H | 3 H | 3 H | 3 H | 3 H |
| Solvent resistance | o | ⊙ | o | ⊙ | ⊙ | ⊙ | ⊙ | o |

TABLE 3-continued

| Type of acrylic copolymer | 1 | 2 | 3 | 4 | 5 | 6 | 7 | 1 |
|---|---|---|---|---|---|---|---|---|
| Stain resistance | o | o | o | o | o | o | o | o |
| Scuff resistance | o | o | o | o | o | o | o | o |
| Adherability | 100/100 | 100/100 | 100/100 | 100/100 | 100/100 | 100/100 | 100/100 | 100/100 |
| | | | | Comparative Example | | | | |
| Type of crossliking agent | HMDI*4 | HMDI | HMDI | HMDI | HMDI | HMDI | HMDI | |
| Pencil hardness | F | HB | F | 2B | 6B | B | B | |
| Solvent resistance | Δ | Δ | x | x | x | x | x | |
| Stain resistance | Δ | Δ | x | x | x | Δ | Δ | |
| Scuff resistance | Δ | Δ | x | x | x | Δ | Δ | |
| Adherabiltiy | 100/100 | 100/100 | 80/100 | 100/100 | 100/100 | 100/100 | 100/100 | |

*4 "MITEC" NY730A (trimer of hexamethylene diisocyanate) produced by Mitsubishi Chemical Corp.
*5 "MITEC" NY215A (Adduct of isophorone diisocyanate with trimethylol propane) produced by Mitsubishi Chemical Corp.

As is clear from Table 1–Table 3, the coat film obtained from the acrylic copolymer composition of the present invention shows high hardness, and excellent properties including heat resistance, breaking strength, flexibility, solvent resistance, scuff resistance and the like, while the coat film obtained from the resin composition of the Comparative Example shows low hardness, and poor properties including breaking strength, solvent resistance and scuff resistance.

Advantages

The present invention has the following particularly advantageous effects and its industrial merits are very large.

1. According to the acrylic copolymer of the present invention, the hydroxyl group introduced into the main chain shows high reactivity since it is bonded to a primary carbon, and has flexibility since it is positioned appropriately apart from the main chain, thus the reactivity is not drastically lowered even after the crosslinking reaction proceeds. Accordingly, an ideally crosslinked product can be obtained under mild conditions.

2. The paint of the present invention has a long pot life and can be used as a paint for various materials, giving a crosslinked coat which shows excellent abrasion for various materialsresistance and chemical resistance and which at the same time has excellent flexibility.

We claim:

1. An acrylic copolymer having a number average molecular weight of 1000–500,000, which comprises 1–90% by weight of a structural unit represented by the following general formula (I):

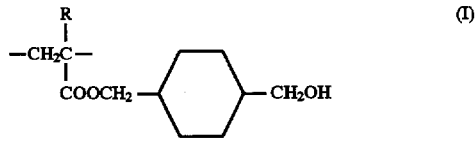

(wherein R represents a hydrogen atom or a methyl group) and 99–10% by weight of a structural unit prepared from an ethylenic unsaturated monomer.

2. An acrylic copolymer according to claim 1, wherein a hard monomer which is selected from the group consisting of methyl methacrylate, styrene, methyl styrene, p-vinyl toluene, acrylonitrile and acrylamide, and a soft monomer which is selected from the group consisting of alkyl acrylate (the number of carbon atoms in the alkyl is 1–21), alkyl methacrylate (the number of carbon atoms in the alkyl is 2–21), vinyl acetate and vinyl propionate are used together as said ethylenic unsaturated monomers.

3. An acrylic copolymer according to claim 1, wherein the acrylic copolymer is obtained by copolymerization of (a) 1–90% by weight of 1,4-cyclohexane dimethanol monoacrylate or 1,4-cyclohexane dimethanol monomethacrylate, (b) 5–94% by weight of said hard monomer, and (c) 5–94% by weight of said soft monomer.

4. An acrylic copolymer according to claim 1, which has a hydroxyl number of 2–250 KOHmg/g.

5. An acrylic copolymer composition in which an acrylic copolymer (A) which is an essential component and has a number average molecular weight of 1000–500,000, and comprises 1–90% by weight of a structural unit represented by the following general formula (I):

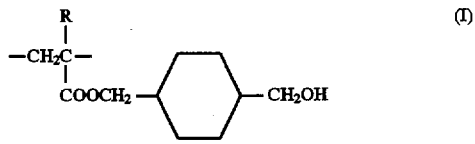

(wherein R represents a hydrogen atom or a methyl group) and 99–10% by weight of a structural unit prepared from an ethylenic unsaturated monomer, is blended with a crosslinking agent (B) which is selected from the group consisting of polyisocyanate compounds, amino resins, epoxy resins, silane compounds and metal chelates.

6. An acrylic copolymer composition according to claim 5, wherein a hard monomer which is selected from the group consisting of methyl methacrylate, styrene, methyl styrene, p-vinyl toluene, acrylonitrile and acrylamide, and a soft monomer which is selected from the group consisting of alkyl acrylate (the number of carbon atoms in the alkyl is 1–21), alkyl methacrylate (the number of carbon atoms in the alkyl is 2–21), vinyl acetate and vinyl propionate are used together as said ethylenic unsaturated monomers.

7. An acrylic copolymer according to claim 5, wherein said acrylic copolymer (A) is obtained by copolymerization of (a) 1–90% by weight of 1,4-cyclohexane dimethanol monoacrylate or 1,4-cyclohexane dimethanol monomethacrylate, (b) 5–94% by weight of said hard monomer, and (c) 5–94% by weight of said soft monomer.

8. An acrylic copolymer composition according to claim 5, wherein said crosslinking agent (B) is a polyisocyanate compound.

9. An acrylic copolymer composition according to claim 5, wherein the hydroxyl number of said acrylic copolymer (A) is 2–250 KOHmg/G.

10. An acrylic copolymer composition according to claim 5, wherein the acrylic copolymer (A) and the crosslinking agent (B) are so mixed that the reactive functional group in the crosslinking agent (B) is in a range between 0.5 and 4 against the hydroxyl group contained in the acrylic copolymer (A).

11. A paint composition in which an acrylic copolymer (A) which is an essential component and has a number average molecular weight of 1000–500,000, and comprises 1–90% by weight of a structural unit represented by the following general formula (I):

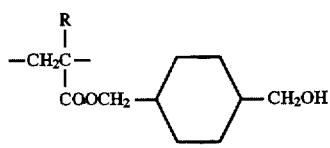

(I)

(wherein R represents a hydrogen atom or a methyl group) and 99–10% by weight of a structural unit prepared from an ethylenic unsaturated monomer, is blended with a crosslinking agent (B) which is selected from the group consisting of polyisocyanate compounds, amino resins, epoxy resins, silane compounds and metal chelates.

12. A paint according to claim 11, wherein a hard monomer which is selected from the group consisting of methyl methacrylate, styrene, methyl styrene, p-vinyl toluene, acrylonitrile and acrylamide, and a soft monomer which is selected from the group consisting of alkyl acrylate (the number of carbon atoms in the alkyl is 1–21), alkyl methacrylate (the number of carbon atoms in the alkyl is 2–21), vinyl acetate and vinyl propionate are used together as said ethylenic unsaturated monomers.

13. A paint according to claim 11, wherein said acrylic copolymer (A) is obtained by copolymerization of (a) 1–90% by weight of 1,4-cyclohexane dimethanol monoacrylate or 1,4-cyclohexane dimethanol monomethacrylate, (b) 5–94% by weight of said hard monomer, and (c) 5–94% by weight of said soft monomer.

14. A paint according to claim 11, wherein said crosslinking agent (B) is a polyisocyanate compound.

15. A paint according to claim 11, wherein the hydroxyl number of said acrylic copolymer (A) is 2–250 KOHmg/g.

* * * * *